United States Patent
Bogner et al.

(10) Patent No.: US 8,457,046 B2
(45) Date of Patent: Jun. 4, 2013

(54) METHOD FOR MULTIPLE REGISTRATION OF A MULTIMODAL COMMUNICATION TERMINAL

(75) Inventors: Christian Bogner, Furth b. Göttweig (AT); Adam Böszörmenyi, Zurndorf (AT); Alexander Milinski, München (DE)

(73) Assignee: Siemens Aktiengesellschaft, Munich (DE)

( * ) Notice: Subject to any disclaimer, the term of this patent is extended or adjusted under 35 U.S.C. 154(b) by 901 days.

(21) Appl. No.: 12/303,799

(22) PCT Filed: May 29, 2007

(86) PCT No.: PCT/EP2007/055179
§ 371 (c)(1),
(2), (4) Date: Dec. 8, 2008

(87) PCT Pub. No.: WO2007/141159
PCT Pub. Date: Dec. 13, 2007

(65) Prior Publication Data
US 2010/0232368 A1 Sep. 16, 2010

(30) Foreign Application Priority Data
Jun. 9, 2006 (DE) .......................... 10 2006 026 929

(51) Int. Cl.
*H04W 4/00* (2009.01)
(52) U.S. Cl.
USPC ........................................ 370/328; 455/435.1
(58) Field of Classification Search
None
See application file for complete search history.

(56) References Cited

U.S. PATENT DOCUMENTS

| 5,793,762 A * | 8/1998 | Penners et al. ................ 370/389 |
| 7,177,642 B2 * | 2/2007 | Sanchez Herrero et al. ........................ 455/435.1 |

(Continued)

FOREIGN PATENT DOCUMENTS

| DE | 10 2004 031 126 | 1/2006 |
| DE | 10 2004 031 A1 | 1/2006 |

(Continued)

OTHER PUBLICATIONS

QUALCOMM: "S2-061474: Use Cases for Multiple Registratios",3GPP TSG SA WG2 Architecture S2#52,[Online] May 8-12, 2006, pp. 1-3, XP002450226 URL:www.3gpp.org; Book; 2006.

(Continued)

*Primary Examiner* — Bunjob Jaroenchonwanit
(74) *Attorney, Agent, or Firm* — Staas & Halsey LLP

(57) ABSTRACT

For multiple registration of a multimodal communication terminal (MKE) via at least one access network in an IMS-based service communication system in a mobile and/or convergent communication system, where the multimodal communication terminal (MKE) is registered for at least one communication service via a first access network (WIAN) in at least one service control unit in the IMS-based service communication system (S-CSCF), a registration message with an access network identifier (ZK) is produced and is transmitted to the at least one service control unit (S-CSCF) in the IMS-based service communication system. The at least one service control unit evaluates the access network identifier (ZK) and takes it as a basis for performing further registration of the multimodal communication terminal in the IMS-based service communication system (S-CSCF).

13 Claims, 3 Drawing Sheets

U.S. PATENT DOCUMENTS

| | | | |
|---|---|---|---|
| 2003/0195957 A1* | 10/2003 | Banginwar | 709/223 |
| 2004/0174864 A1* | 9/2004 | Klaghofer | 370/352 |
| 2004/0230697 A1* | 11/2004 | Kiss et al. | 709/245 |
| 2004/0243680 A1* | 12/2004 | Mayer | 709/206 |
| 2005/0009520 A1* | 1/2005 | Herrero et al. | 455/435.1 |
| 2005/0243870 A1 | 11/2005 | Balogh et al. | |
| 2006/0212549 A1* | 9/2006 | Hokkyo et al. | 709/220 |
| 2006/0258358 A1* | 11/2006 | Kallio | 455/437 |
| 2007/0124438 A1* | 5/2007 | Park et al. | 709/223 |
| 2007/0142073 A1* | 6/2007 | Idnani | 455/518 |
| 2007/0201430 A1* | 8/2007 | Holmstrom et al. | 370/352 |
| 2007/0263640 A1* | 11/2007 | Finn | 370/401 |
| 2008/0008157 A1* | 1/2008 | Edge et al. | 370/351 |
| 2008/0019387 A1* | 1/2008 | Kim et al. | 370/401 |
| 2008/0070573 A1* | 3/2008 | Dutta et al. | 455/435.1 |
| 2008/0198845 A1* | 8/2008 | Boman | 370/389 |
| 2008/0205392 A1* | 8/2008 | Danzeisen et al. | 370/389 |
| 2009/0210452 A1* | 8/2009 | Ishii | 707/200 |
| 2010/0232368 A1* | 9/2010 | Bogner et al. | 370/329 |
| 2011/0219007 A1* | 9/2011 | Fukuta et al. | 707/741 |

FOREIGN PATENT DOCUMENTS

| | | |
|---|---|---|
| EP | 1 512 260 | 11/2005 |
| EP | 1 512 260 B1 | 11/2005 |
| JP | 2005-521349 | 7/2005 |
| WO | 03/081937 A1 | 10/2003 |
| WO | 2004/102900 A1 | 11/2004 |
| WO | 2006/057924 A2 | 6/2006 |

OTHER PUBLICATIONS

3GPP: "Digital cellular telecommunications system (Phase 2+)", ETSI Standards, European Telecommunications Standards Institute, Sophia-Antipo, FR, vol. 3-CN1, Nr. V730, Mar. 2006, XP014034225, ISSN: 0000-0001 pp. 28-33, 69-71, 121-122,; Others; 2006.

3GPP TS 23.234 V6.0.0 (Mar. 2004),3rd Generation Partnership Project; Technical Specification Group Services and System Aspects;3GPP system to Wireless Local Area Network (VT/LAN) interworking; System description (Release 6); Others; 2004.

3GPP TS 23.228 V6.0.0. (Jan. 2003), 3rd Generation Partnership Project;Technical Specification Group Services and System Aspects; IP Multimedia Subsystem (IMS);Stage 2 (Release 5); Others; 2003.

QUALCOMM: "S2-061474: Use Cases for Multiple Registrations" 3GPP TSG SA WG2 Architecture S2#52, [Online] May 8-12, 2006, pp. 1-3, XP002450226.

3GPP: "Digital Cellular Telecommunications System (Phase 2+)" ETSI Standards, European Telecommuncations Standards Institute, Sophia-Antipo, FR, vol. 3-CN1, Nr. V730, Mar. 2006 XP014034225, ISSN: 0000-0001 pp. 28-33, 69-71, 121-122; Others; 2006.

3GPP TS 23.234 V6.0.0 (Mar. 2004) 3rd Generation Partnership Project; Technical Specification Group Services and System Aspects; 3GPP System to Wireless Local Area Network (WLAN) Interworking; System Description (Release 6); Others; 2004.

3GPP TS 23.228 V6.0.0 (Jan. 2004) 3rd Generation Partnership Project; Technical Specification Group Services and System Aspects; IP Multimedia Subsystem (IMS); Stage 2 (Release 5); Others; 2003.

* cited by examiner

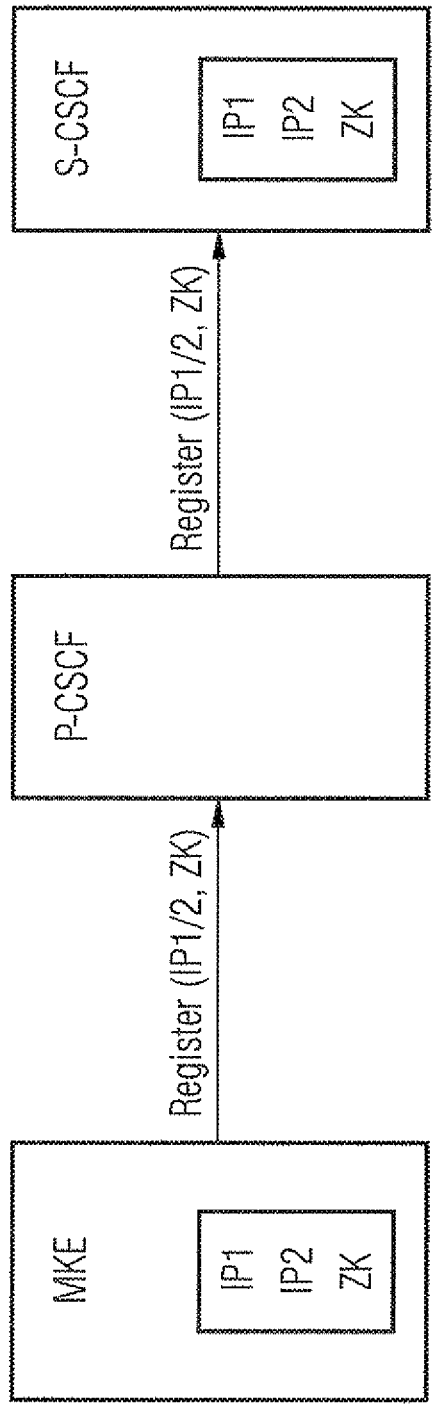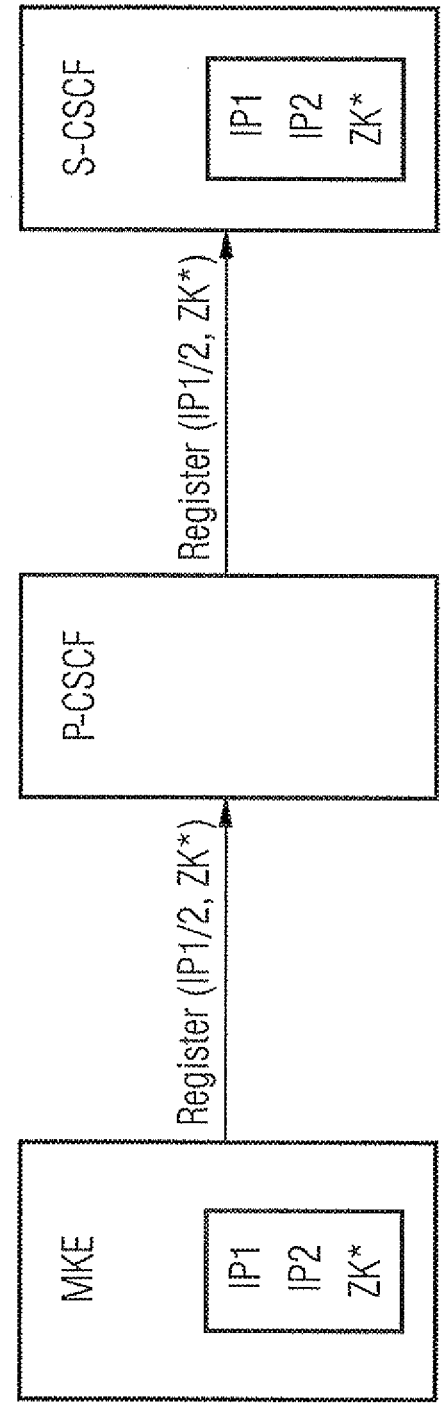

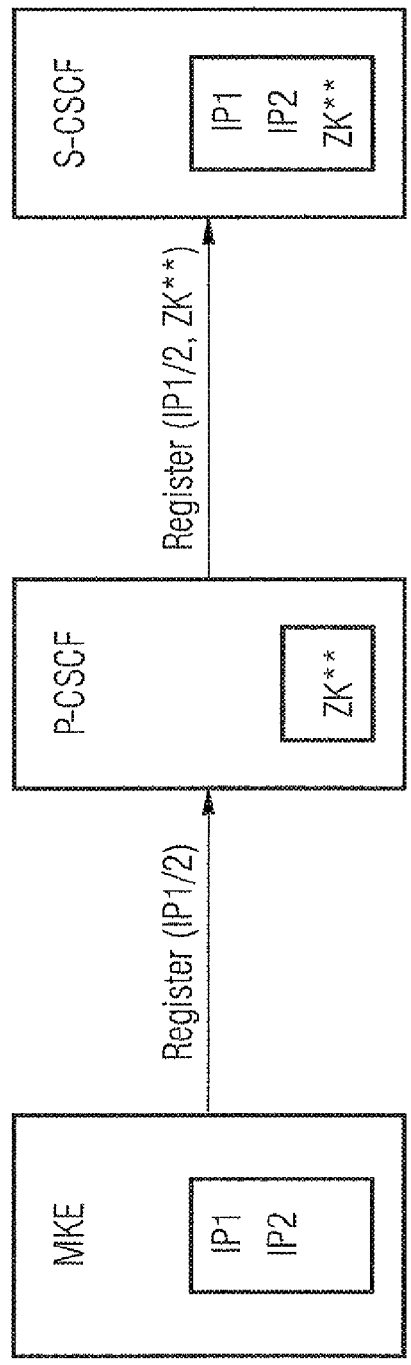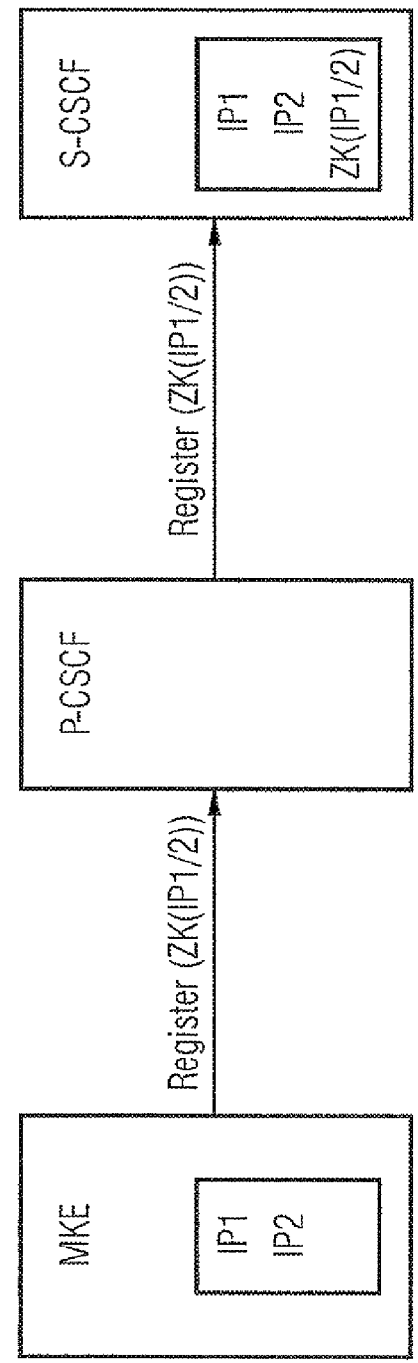

METHOD FOR MULTIPLE REGISTRATION OF A MULTIMODAL COMMUNICATION TERMINAL

CROSS REFERENCE TO RELATED APPLICATIONS

This application is based on and hereby claims priority to International Application No. PCT/EP2007105517 9 filed on May 29, 2007, and German Application No. 10 2006 026 929.2, filed on Jun. 9, 2006, the contents of both of which are herein incorporated by reference.

BACKGROUND

1. Field of the Invention

The embodiments discussed herein relate to a method for multiple registration of a multimodal communication terminal via at least one access network in an IMS-based service communication system of a mobile and/or convergent communication system, where the multimodal communication terminal is registered for at least one communication service via a first access network in at least one service control unit of the IMS-based service communication system.

2. Description of the Related Art

Existing mobile communication systems of the second generation, called "Global System for Mobile Communications" (GSM) mobile communication systems, communication services such as, for example, GPRS ("General Packet Radio Services") which are based on packet-oriented data transmission, are already available. By this mechanism an improved utilization of the available transmission resources is possible in the associated mobile communication system.

In particular for mobile communication systems of the third generation, i.e. mobile communication systems based on the "Universal Mobile Telecommunication System" (UMTS) transmission technology, special communication systems or, more specifically, service communication systems such as, for example, the "Internet Protocol Multimedia Subsystem" (IMS) communication system are provided for extending the existing GPRS architecture and providing additional multimedia communication services.

Moreover, mobile communication devices are increasingly embodied as multimodal, i.e. they support the most diverse mobile transmission technologies or access technologies. For example, a "Wireless Local Area Network" (WLAN) can be provided as a supplementary access network alongside a UMTS- or GSM-based mobile communication system.

A distinction needs to be drawn between mobile access networks of the kind and communication systems based on the Internet Protocol (IP) which enable IP-based communication services of a network operator to be used. Usually IP-based communication systems of the kind are geared to the mobile transmission technology that is present in each case. For example, the mobile communication systems based on the GSM and UMTS transmission technologies share a common access network based on the GPRS transmission technology, whereas a separate independent access network is required for a WLAN communication network. If a mobile communication terminal now changes the mobile transmission technology or, as the case may be, access technology used for transmitting the data, from WLAN to GSM/UMTS for example, this change additionally necessitates a change of the associated IP-based communication system as well.

Service users connected to the IMS-based communication system are provided with communication or multimedia services via an access network of this kind. At this juncture, voice services, data services, audio services, video services, information services and program communication services may be cited as examples of communication or multimedia services.

A "Session Initiation Protocol" (SIP) signaling protocol is provided within an IMS-based communication system of the kind for the purpose of setting up communication connections. Communication subscribers within the IMS-based communication system are identified via identifiers that remain stable for a long time, called SIP "Uniform Resource Identifiers" (URI), which are structured similarly to a traditional email address.

The IMS-based communication system or service communication system specified by 3GPP can be used independently of the access network, i.e. in addition to the GPRS technology of second- and third-generation mobile communication systems also for WLAN, WiMAX ("Worldwide Interoperability for Microwave Access") and DSL ("Digital Subscriber Line"). The IP address required for accessing an access network is usually assigned to the multimodal communication terminal by the access network and consequently is linked to this access network. In this context, the term "access network" is used in a very broad sense and includes a gateway network node, e.g. in the case of a WAN access network the "Packet Data Gateway" (PDGW) network node defined in the 3GPP TS 23.234 standard.

The SIP signaling protocol (IETF RFC 3261) provided within the IMS-based communication system requires every mobile communication terminal to register on the IMS-based communication system (3GPP TS 23.228/24.229). In order to implement the SIP signaling protocol, special server units are provided which provide connection and service control functions, referred to as "Call State Control Functions" (CSCF).

An IMS-based communication system of the kind includes, for example, a "Serving Call Session Control Function" (S-CSCF) unit, an "Interrogation Call Session Control Function" (I-CSCF) unit and a "Proxy Call Session Control Function" (P-CSCF) unit which handle different signaling tasks. For example, the SCSCF unit is responsible for registering a mobile communication terminal in the IMS-based communication system, the unit serving according to RFC 3261 to establish a link between the address information at SIP level (SIP-URI) and the address information at IP level (IP address) in order to be able to forward an incoming SIP session with a SIP-URI correctly to the right IP address. In the IMS architecture the authentication is also linked to the registration, which means that the authentication is also a requirement for an outgoing SIP session.

It is provided in particular in 3GPP TS 24.229, paragraph 5.4.1.2.1 that a new registration of a mobile communication terminal under the same SIP-URI (in IMS: "Public User Identity") and the same user name (in IMS: "Private User Identity") replaces an already existing registration. By this means it is ensured that in the case of a new allocation of an IP address to a mobile communication terminal as a result of a malfunction affecting the radio connection the old IP address has meanwhile become invalid. Address conflicts can be effectively avoided in this way.

If the user of a multimodal mobile communication terminal changes the access network, it is necessary to allow multimodal mobile communication terminals to register at least temporarily for a plurality of access networks in an IMS-based communication system. In order to ensure a user-friendly change, at least two access networks should be available simultaneously at least for a predetermined transition period.

Although it is possible, in deliberate circumvention of the 3GPP specifications, to force a parallel registration of a multimodal mobile communication terminal by performing a second registration via the S-CSCF unit without deleting the first registration, this can, however, result in undesirable disruptive effects, such as, for example, communication connections being able to continue to be sent erroneously to IP addresses that have become invalid within the IMS-based communication system.

Furthermore it is also possible to use a cross-network "Public User Identity" (SIP-URI), though with different "Private User Identities" (user names). A method of the kind was originally developed for access via physically separate communication terminals. A disadvantage in this case, however, is that a plurality of different "Private User Identities" have to be assigned to the smartcard (ISIM or IMS "SIM card") contained in the mobile communication terminal, thereby considerably reducing the ease of use of the mobile communication terminal.

SUMMARY

An aspect of the embodiments lies in disclosing a technically simple and user-friendly method for multiple registration of at least one multimodal communication terminal in an IMS-based service communication system.

An important aspect of the method is to be seen in the fact that in order to register the multimodal communication terminal via at least one second access network a registration message containing an access network identifier is generated and transmitted to the at least one service control unit of the IMS-based service communication system. The access network identifier is subsequently evaluated in the at least one service control unit and, depending on the result of the evaluation, a further registration of the multimodal communication terminal is performed in the IMS-based service communication system. In this way a multiple registration of a multimodal communication terminal for different access technologies is made possible by a simple modification of the registration message implemented according to the SIP signaling protocol, without compromising ease of use for the user.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 2 shows by way of example a schematic representation of individual signaling steps of the method, and FIGS. 3-5 show by way of example further alternative embodiments of the registration method.

DETAILED DESCRIPTION

Figure 1:
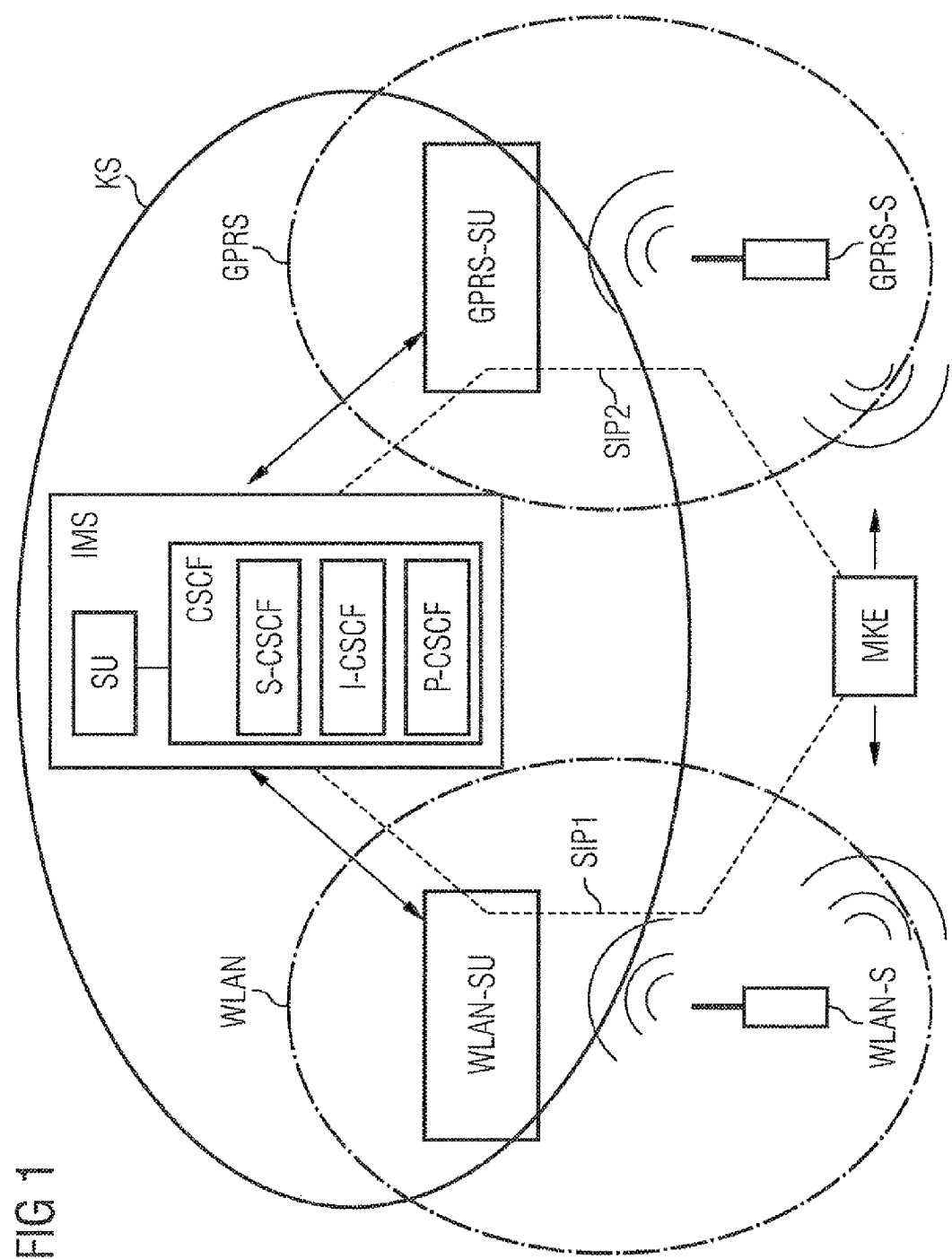
FIG. 1 shows by way of example in a schematic block diagram the essential components of a communication system for carrying out the method.

Reference will now be made in detail to the embodiments, examples of which are illustrated in the accompanying drawings, wherein like reference numerals refer to like elements throughout.

FIG. 1 shows, by way of example in a schematic block diagram, individual network components of a communication system KS that are required for providing communication services, in particular multimedia communication services.

In this case the communication system KS embodied, for example, as a mobile or convergent communication network has at least one service communication system IMS which can be connected to a preferably multimodal communication terminal MKE via a first access network WLAN and a second access network GPRS.

The first and second access network WLAN, GPRS are connected to the service communication system IMS via signaling connections. In this case the number and embodiment of the access networks WLAN, GPRS are on no account limited to the first and second access network WLAN, GPRS. These are cited simply by way of example, i.e. other access networks having other different access technologies, for example CDMA or CDMA2000, WiMAX, DSL (not shown in the figure), can also be provided.

In the present exemplary embodiment the multimodal communication terminal MKE located by way of example in the reception area of the first and second access network WLAN, GPRS supports at least two different access technologies, namely the "Wireless Local Area Network" (WLAN) technology and the "General Packet Radio Service" (GPRS) technology. Analogously hereto, the first access network WLAN is embodied as a "Wireless Local Area Network" (WLAN) and the second access network GPRS as a "General Packet Radio Service" access network GPRS which have assigned to them a WLAN connection control unit WLAN-SU and GPRS connection control unit GPRS-SU respectively.

Controlled via the WLAN connection control unit WLAN-SU and GPRS connection control unit GPRS-SU respectively, a WLAN radio interface WLAN-S and GPRS radio interface GPRS-S respectively are provided for connecting the at least one multimodal communication terminal MKE to the communication system KS or its service communication system IMS. A first and second IP address IP1, IP2 are allocated via the WLAN connection control unit WLAN-SU and GPRS connection control unit GPRS-SU respectively for the purpose of addressing the multimodal communication terminal MKE within the respective first and second access network WLAN, GPRS.

The service communication system IMS is preferably embodied as an "IP Multimedia Core Network Subsystem" (IMS), referred to hereinafter as an IMS-based service communication system IMS. The IMS-based service communication system IMS has a control unit CSCF having at least three service control units S-CSCF, I-CSCF, P-CSCF and a memory unit SU connected thereto.

Within an IMS-based service communication system IMS of the kind, communication services are set up via the standardized "Session Initiation Protocol" (SIP) signaling protocol. The multimodal communication terminal MKE is connected to the IMS-based service communication system IMS via, for example, a first or second signaling connection SIP1, SIP2 operating in accordance with the SIP signaling protocol. The mobile communication telephone number (MSISDN) of the multimodal communication terminal MKE for example is transmitted via the first or second signaling connection SIM, SIP2 to the IMS-based service communication system IMS in the course of the registration of the communication services.

The signaling functions within the IMS-based service communication system IMS are handled by the control unit CSCF which for that purpose has, for example, a "Serving Call Session Control Function" (S-CSCF) unit S-CSCF, an "Interrogation Call Session Control Function" (I-CSCF) unit I-CSCF and a "Proxy Call Session Control Function" (P-CSCF) unit P-CSCF, which are in each case connected to one another.

As the "SIP registrar" in the IMS-based service communication system IMS, the S-CSCF unit S-CSCF is responsible for registering mobile communication terminals, in particular the multimodal mobile communication terminal MKE. A registration message REGISTER is generated for the purpose of registering the multimodal communication terminal MKE for a selected communication service and transmitted via the SIP signaling protocol or, as the case may be, the first or second signaling connection SIP1, SIP2 to the S-CSCF unit S-CSCF. In this way a link between the SIP-URI assigned to the multimodal communication terminal MKE and its IP address, for example the first and/or second IP address IP1, IP2, is established in accordance with RFC 3261 in the S-CSCF unit SCSCF in order thereby to ensure the correct switching of a communication service based on the SIP-URI to the assigned IP address IP1, IP2.

FIGS. 2 and 3 show, by way of example in a schematic block diagram, the units required for implementing the multiple registration method for multimodal communication terminals MKE within the IMS-based service communication system IMS.

Provided in addition to the multimodal communication terminal MKE are the PCSCF unit P-CSCF and the SCSCF unit S-CSCF acting as SIP registrar, which are preferably connected to each other via the SIP signaling protocol. In this case the PCSCF unit P-CSCF is cited as an example of an arbitrary network node supporting the SIP signaling protocol.

For the further embodiments it is assumed that the multimodal communication terminal MKE is already registered for a communication service in the IMS-based service communication system IMS via the first access network WLAN and that a first IP address 1P1 has already been allocated to it by the first access network WLAN. The first IP address IP1 is preferably stored in the multimodal communication terminal MKE and in the S-CSCF unit S-CSCF.

If the multimodal communication terminal MKE now changes from the first access network WLAN to the second access network GPRS, the multimodal communication terminal MKE is allocated a second IP address IP2 by, for example, the GPRS connection control unit GPRS-SU. Under the control of, for example, the multimodal communication terminal MKE, a registration message REGISTER implemented in accordance with the SIP signaling protocol is then generated.

According to the embodiments an access network identifier ZK is provided for example in the registration message REGISTER and the registration message REGISTER containing the access network identifier ZK is transmitted to the at least one control unit CSCF or, as the case may be, to the S-CSCF unit S-CSCF responsible for the SIP registration in the IMS-based service communication system IMS. In the S-CSCF unit S-CSCF, the access network identifier ZK is then read out from the registration message REGISTER and evaluated, i.e. a check is carried out to determine the presence or non-presence of an access network identifier ZK in the registration message REGISTER.

Depending on the result of the evaluation, i.e. on the presence or non-presence of an access network identifier ZK, a further registration of the multimodal communication terminal MKE is performed by the S-CSCF unit S-CSCF in the IMS-based service communication system IMS or the already existing registration of the multimodal communication terminal MKE is replaced by a new registration. If, for example, —as indicated in FIG. 2—an existing registration is already present for the first access network WLAN and if the result of the evaluation of the access network identifier ZK of a registration request for the second access network GPRS is that a further registration is possible, the multimodal communication terminal MKE is also registered for the second access network GPRS and the second IP address IP2 allocated by the latter is stored in addition to the first IP address IP1. If, on the other hand, the result of the evaluation is that a multiple registration of the multimodal communication terminal is not possible, then the first IP address IP1 is replaced by the second IP address IP2 and the already existing registration is deleted.

In an embodiment, the first and/or second IP address IP1, 1P2 already assigned to the multimodal communication terminal MKE are/is transmitted as an access network identifier ZK or in addition to the access network identifier ZK in the registration message REGISTER.

In a first variant of the method according to the embodiments, an access network identifier ZK is generated in the multimodal communication terminal MKE and inserted into the registration message REGISTER as well as transmitted in the latter from the multimodal communication terminal MKE via the P-CSCF unit PCSCF to the S-CSCF unit S-CSCF.

The access network identifier ZK is read out from the registration message REGISTER by the control unit CSCF or, as the case may be, the S-CSCF unit S-CSCF. In this case the access network identifier ZK indicates that the currently existing registration for the first access network WLAN continues to persist. The first IP address IP1 currently assigned to the multimodal communication terminal MKE by the first access network WLAN and, for example, transmitted as well continues to persist.

Accordingly, as part of the further registration of the multimodal communication terminal MKE for the second access network GPRS, a second IP address IP2 is stored by the S-CSCF unit S-CSCF and the existing registration continues to be maintained within the IMS-based service communication system IMS. Registration having been completed, the multimodal communication terminal MKE can now avail itself of the assigned communication service via the first or second IP address IP1, IP2 depending on the access network WLAN, GPRS in which it is currently located.

The access network identifier ZK can be inserted for example into the header of the registration message REGISTER or be appended to the register message REGISTER as an additional parameter.

In the absence of an access network identifier ZK all existing registrations for the multimodal communication terminal MKE and possibly also its first IP address IP1 stored in the S-CSCF unit S-CSCF are deleted within the IMS-based service communication system IMS and a new registration is performed for the second access network GPRS. The second IP address IP2 allocated by the second access network GPRS is in turn stored in the S-CSCF unit S-CSCF.

The network elements of the communication system KS are configured in such a way that the necessary settings for generating, evaluating and setting up further registrations can be made both on the terminal side and on the network side.

In a second variant of the method according to the embodiments, owing to the different access technology of the access networks, for example of the first and second access networks WLAN, GPRS, the access network identifier ZK is embodied as a technology-oriented access network identifier ZK*, ZK**, i.e. the technology-oriented access network identifier ZK*, ZK** in each case specifies the access technology on which the new registration is based.

The technology-oriented access network identifier ZK*, ZK** is either generated according to FIG. 3 in the multimodal communication terminal MKE and inserted by the latter into the register message REGISTER or generated and inserted according to FIG. 4 by a further network node supporting the SIP signaling protocol, the P-CSCF unit P-CSCF, for example, which network node supports the respective access technology of the first or second access network WLAN, GPRS, with a specially embodied network node or a P-CSCF unit P-CSCF being provided for one access technology in each case.

The technology-oriented access network identifier ZK*, ZK** thus specifies the access technology or, as the case may be, the associated access network WLAN, GPRS for which the multimodal communication terminal MKE requests a further registration in the IMS-based service communication system IMS.

The technology-oriented access network identifier ZK*, ZK** transmitted in the register message REGISTER is read out and evaluated by the S-CSCF unit S-CSCF. In the course of the evaluation a check is made by the S-CSCF unit SCSCF in particular to determine for which access technologies or, as the case may be, for which associated access network WLAN, GPRS a registration is already present.

If a registration is already present for the determined access technology, the existing registration is replaced by the new registration. If a different access technology is determined, a further registration of the multimodal communication terminal MKE is performed by the S-CSCF unit S-CSCF for the determined access technology.

In a third variant of the method according to the embodiments, the access technology is derived in the S-CSCF unit S-CSCF from the information provided in the registration message REGISTER, for example from one of the transmitted IP addresses IP1, IP2, For example, within the communication system KS each access technology or, as the case may be, the first and second access network WLAN, GPRS can be assigned a defined IP address range for example. For example, multimodal communication terminals MKE registered via the first access network WLAN are assigned a first IP address IP1 having the format 140.119.xxx.xxx and the multimodal communication terminals MKE registered via the second access network WLAN are assigned a second IP address IP2 having the format 139.123.xxx.xxx. At least one of the two IP addresses IP1, IP2 is transmitted as the access network identifier ZK(IP1, IP2) via the registration message REGISTER and read out in the S-CSCF unit S-CSCF.

The S-CSCF unit S-CSCF evaluates the first and/or second IP address IP1 transferred in the registration message REGISTER and on the basis thereof determines that access technology for which a registration is currently desired or for which a registration is already present. Analogously to the described second variant, depending on the result of the evaluation, either a further registration is performed by the S-CSCF unit SCSCF or the existing registration is replaced by the new registration.

In addition, further elements of the registration message REGISTER, for example the entire header or individual header elements, can be evaluated by the S-CSCF unit S-CSCF for the purpose of determining the access technology.

The embodiments herein have been described hereintofore with reference to an exemplary embodiment. It shall be understood that numerous modifications and variations are possible without departing from the concept underlying the embodiments.

The system also includes permanent or removable storage, such as magnetic and optical discs, RAM, ROM, etc. on which the process and data structures can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase at least one of A, B and C" as an alternative expression that means one or more of A, B and C may be used, contrary to the holding in *Superguide* v *DIRECTV,* 358 F3d 870, 69 USPQ2d 1865 (Fed. Cir. 2004).

The invention claimed is:

1. A method for multiple registration of a multimodal communication terminal via at least one access network in an "Internet Protocol Multimedia Subsystem"-based service communication system (IMS) of a mobile and/or convergent communication system, wherein the multimodal communication terminal is registered for at least one communication service via a first access network in at least one service control unit of the IMS-based service communication system, comprising:
    generating and transmitting, in order to register the multimodal communication terminal via at least one second access network, a registration message which is generated and transmitted to the at least one service control unit of the IMS-based service communication system,
    deriving an access technology of the at least one second access network from an information provided in the registration message;
    checking whether the access technologies of the first access network and the at least one second access network are different;
    depending on the result of said check, performing one of a further registration of the multimodal communication terminal in the IMS-based service communication system and substituting a new registration for an existing registration.

2. The method as claimed in claim 1, wherein the registration message is transmitted via a "Session Initiation Protocol" signaling protocol.

3. The method as claimed in claim 1, wherein the access technology provided for the further registration is determined by the service control unit based on the IP address(es) already assigned to the multimodal communication terminal, by evaluating the individual address components of the assigned IP address(es).

4. The method as claimed in claim 1, wherein in the course of an evaluation a check is carried out by the service control unit to determine for which access technologies or, as the case may be, for which access network a registration of the multimodal communication terminal is already present.

5. The method as claimed in claim 1, wherein
said information provided in the registration message is an IP-address assigned to the multimodal communication terminal by the at least one second access network.

6. The method as claimed in claim 1, wherein
a further registration of the multimodal communication terminal in the IMS-based service communication system is performed if, according to the result of said check, the access technologies of the first access network and the at least one second access network are different.

7. The method as claimed in claim 1, wherein
said information provided in the registration message is an access network identifier.

8. The method as claimed in claim 7, wherein said access network identifier is a technology-oriented access network identifier that specifies the respective access technology of the second access network.

9. The method as claimed in claim 7, wherein the access network identifier is formed by an IP address allocated to the multimodal communication terminal in each case.

10. The method as claimed in claim 7, wherein the access network identifier is inserted into the registration message by the multimodal communication terminal or a network node supporting the SIP signaling protocol.

11. The method as claimed in claim 7, wherein when an access network identifier or a technology-oriented access network identifier specifying a different access technology is present, a further registration of the multimodal communication terminal is performed in the IMS-based service communication system.

12. The method as claimed in claim 11, wherein in the event of a further registration of the multimodal communication terminal for the communication service, the IP address of the second access network is stored in the service control unit in addition to the first IP address.

13. The method as claimed in claim 7, wherein in the event of a missing access network identifier or a technology-oriented access network identifier relating to the same access technology, all existing registrations for the multimodal communication terminal are deleted.

\* \* \* \* \*

UNITED STATES PATENT AND TRADEMARK OFFICE
CERTIFICATE OF CORRECTION

PATENT NO. : 8,457,046 B2
APPLICATION NO. : 12/303799
DATED : June 4, 2013
INVENTOR(S) : Christian Bogner et al.

Page 1 of 1

It is certified that error appears in the above-identified patent and that said Letters Patent is hereby corrected as shown below:

In the Specification:

Column 1, Line 9, Delete "PCT/EP20071055179" and insert -- PCT/EP2007/055179 --, therefor.

Signed and Sealed this
Tenth Day of September, 2013

Teresa Stanek Rea
*Acting Director of the United States Patent and Trademark Office*